US012460474B2

(12) United States Patent
Vanbever

(10) Patent No.: US 12,460,474 B2
(45) Date of Patent: Nov. 4, 2025

(54) STORM SHUTTER INTEGRATED INTO A WINDOW OR DOOR

(71) Applicant: Condado Window Hurricane Protection Inc., San Juan, PR (US)

(72) Inventor: Robert F. Vanbever, San Juan, PR (US)

( * ) Notice: Subject to any disclaimer, the term of this patent is extended or adjusted under 35 U.S.C. 154(b) by 283 days.

(21) Appl. No.: 17/888,222

(22) Filed: Aug. 15, 2022

(65) Prior Publication Data

US 2024/0052692 A1 Feb. 15, 2024

(51) Int. Cl.
*E06B 9/17* (2006.01)
*E06B 9/15* (2006.01)
*E06B 9/68* (2006.01)

(52) U.S. Cl.
CPC .............. *E06B 9/1703* (2013.01); *E06B 9/15* (2013.01); *E06B 9/17061* (2013.01); *E06B 9/68* (2013.01)

(58) Field of Classification Search
CPC ..... E06B 9/58; E06B 9/68; E06B 9/11; E06B 9/15; E06B 9/17; E06B 9/17007; E06B 9/17015; E06B 9/17023; E06B 9/1703; E06B 9/17061
See application file for complete search history.

(56) References Cited

U.S. PATENT DOCUMENTS 4,399,855 A * 8/1983 Volfson .................... E06B 9/11 160/271
5,070,925 A * 12/1991 Paule .................. E06B 9/17061 160/133
6,755,231 B1 * 6/2004 Biggers ................. E06B 9/0638 160/183
6,901,701 B2 * 6/2005 Lee ......................... E06B 7/096 49/82.1
8,490,670 B2 * 7/2013 Miller ....................... E06B 9/17 160/133
9,341,021 B2 * 5/2016 Lu ....................... E06B 9/17007
9,428,955 B2 * 8/2016 Fleischman ......... E04F 10/0607
10,139,200 B2 * 11/2018 Derode ............... E06B 9/17007
10,844,657 B2 * 11/2020 Fleischman ............. E06B 9/174
11,957,261 B2 * 4/2024 Giri ........................... E06B 9/44
2008/0017329 A1 * 1/2008 Miller ....................... E06B 9/58 160/133
2009/0071082 A1 * 3/2009 Van Der Kort ........... E06B 9/11 52/741.3
2016/0032646 A1 * 2/2016 Fleischman ............... E06B 9/68 16/96 R
2017/0159352 A1 * 6/2017 Cooper ..................... E06B 9/72
2017/0298685 A1 * 10/2017 Witt .......................... E06B 9/15
2020/0208464 A1 * 7/2020 Guest .................... E06B 9/1703
2024/0052692 A1 * 2/2024 Vanbever ............ E06B 9/17061

* cited by examiner

*Primary Examiner* — Johnnie A. Shablack
(74) *Attorney, Agent, or Firm* — Eugenio J. Torres-Oyola; Victor M. Rodriguez-Reyes; Rafael Rodriguez-Muriel

(57) ABSTRACT

The system includes a storm shutter integrated into a window or door that is installed as a single unit. The storm shutter is made of an aluminum extrusion material that is resistant to hurricane impact, including impact from projectiles. The storm shutter can receive service or maintenance on location, wherein the storm shutter can be repaired or serviced, from inside the building it is installed, without the need to uninstall the system. The system provides for multiple configurations of doors and fixed or operable windows.

5 Claims, 8 Drawing Sheets

WINDOW EMBODIMENT DOOR EMBODIMENT

WINDOW EMBODIMENT

DOOR EMBODIMENT

STORM SHUTTER INTEGRATED INTO A WINDOW OR DOOR

STATEMENT REGARDING FEDERALLY SPONSORED RESEARCH OR DEVELOPMENT

N/A

BACKGROUND OF THE INVENTION

1. Field of the Invention

The present invention relates to a window or door that integrates a storm shutter system and is installed as a single unit.

2. Description and Shortcomings of the Related Art

There has been an increase of hurricane activity and strength in recent years. As climate continues to warm, it is expected hurricane frequency and intensity will only continue to increase. As such, the long-term effects of climate change may result in the frequent presence and rise of natural disasters. Therefore, there is a clear need to create products that provide protection against the effects of natural disasters. It is imperative to address the safety and protection of buildings against the impact of natural disasters, such as flooding, water damage and projectiles. Some of the most important areas of buildings that require protection against impact from natural disasters are doors and windows.

Currently, there are multiple storm shutters for the protection of windows in a building. However, existing storm shutters lack important useful aspects that the present disclosure provides. For example, a storm shutter that is integrated into a window or door and is installed as a single unit. This allows the storm shutter to be available for use at any moment without having to: . . . constantly install and uninstall the shutter. Since hurricanes and natural disasters are difficult to predict, once a trajectory forecast reflects imminent impact to a particular location, there is limited time to act in order to gather the necessary resources for safety and survival. Therefore, having an integrated storm shutter that has been installed as part of the window and/or door system significantly reduces the time invested in preparation for the impact of a natural disaster. Publication No. CN203248041U discloses a combination window which comprises a shutter arranged on the outside of the window frame. However, it does not protect against storms and projectiles as the present disclosure does; it has the effect of providing sunshade, sound insulation and antitheft. Also, U.S. Publication No. 20090090062A1 discloses a combined window and shutter system that features a pair of shutter doors that are hinged to the side portions of the frame and use a latch to keep closed or unlatch to open to the sides. The present shutter system comprises a single shutter that rolls up or down and does not require a latch within the shutter to keep it open or closed. Additionally, existing systems fail to disclose a window or door storm shutter system in which the storm shutter is made of an aluminum extrusion material. For instance, U.S. Publication No. US 2007/0187042 A1, discloses a protective shutter system wherein the shutter is made of a woven composite material with high tensile strength. The present disclosure comprises a storm shutter that is made of aluminum extrusion that is resistant to hurricane impact, including impact from projectiles. Other storm shutter systems do not disclose a capability for the storm shutter to be repaired or maintained on location. For example, if the storm shutter requires fixing or upkeep, the prior art does not provide for the storm shutter to be fixed or repaired while installed.

SUMMARY OF THE INVENTION

The present disclosure relates to a storm shutter system integrated into a window or door, wherein the window or door comprises an integral shutter that provides protection to buildings during storms, hurricanes or similar atmospheric phenomena, including protecting the building from projectile impact. The system can be installed as a single unit, wherein the window, or door, and the shutter each have their own separate frames. The system can also be adapted to any size opening in a building, providing for multiple commercial or residential embodiments for windows and doors. The multiple embodiments include integral shutter systems for fixed or operable windows, single or double outswing entrance doors, or sliding glass doors with up to four sliding panels. An aspect of the present disclosure is that the system can receive maintenance or service without removing the system altogether. In other words, if the system requires repairing or maintenance, such upkeep and repair can be executed without requiring the system to be removed from the building. The system can be accessed from inside the building in which the system is installed in case any repair is required.

The disclosure discussed herein is designed to comply with the International Building Code ("IBC"), International Residential Code ("IRC") and Florida Building Code ("FBC"), including special codes applied in the FBC to High Velocity Hurricane Zone ("HVHZ"). The storm shutter: is made of an aluminum extrusion that is thick in order to resist impact from atmospheric phenomena. The glass type and thickness of the windows and doors complies with the Standard Practice for Determining Load Resistance of Glass in Buildings ("ASTM E1300 Requirements") and applicable safety glazing requirements from the FBC.

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Other features and advantages of the present invention will become apparent upon examining the following detailed description of an embodiment thereof, taken in conjunction with the attached drawings.

DETAILED DESCRIPTION OF THE PREFERRED EMBODIMENT

Figure 1:
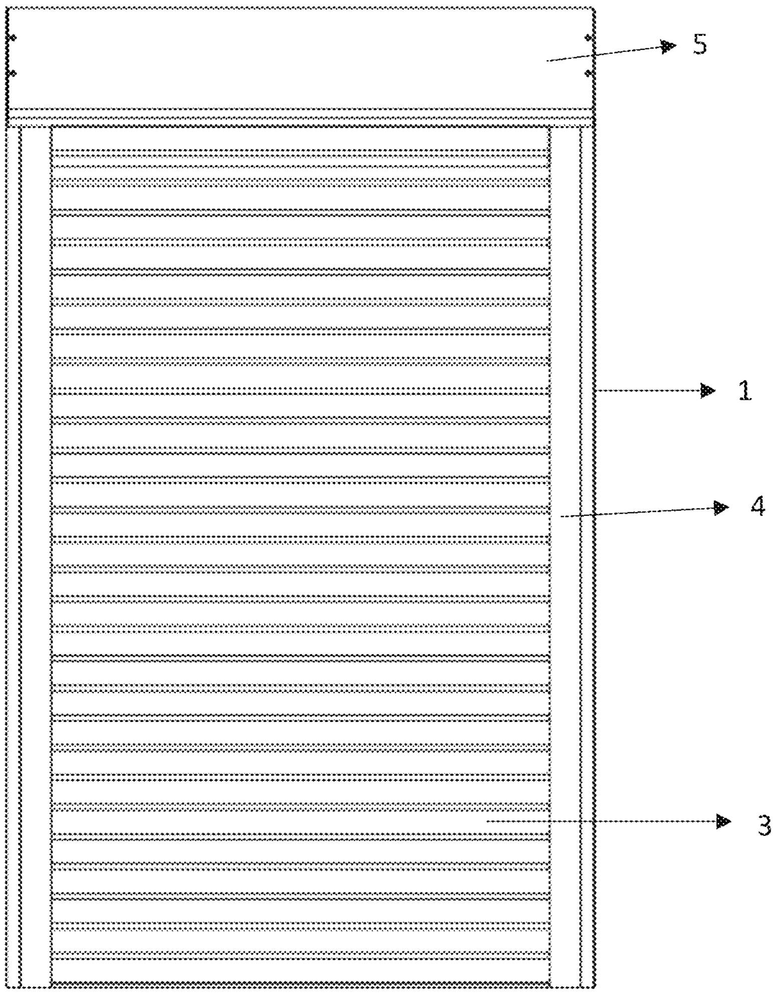
FIG. 1 is an exemplary view of the structure of the preferred embodiment in accordance with the principles of the present disclosure.
Figure 2:
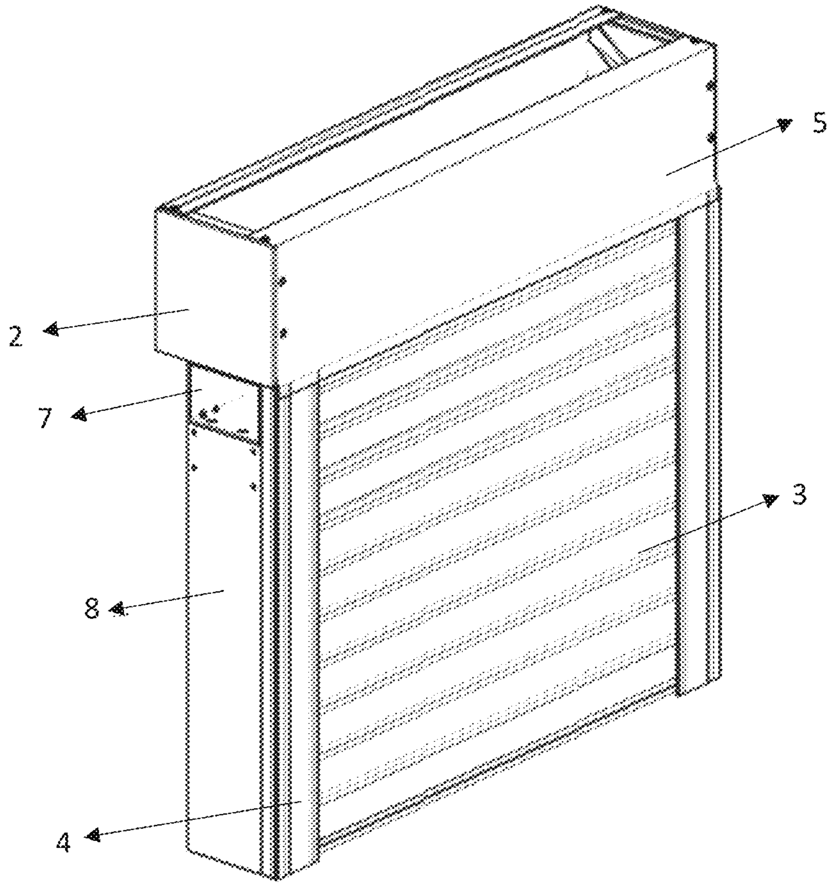
FIG. 2 shows an exemplary view of the shutter assembly of structure of FIG. 1.
Figure 3:
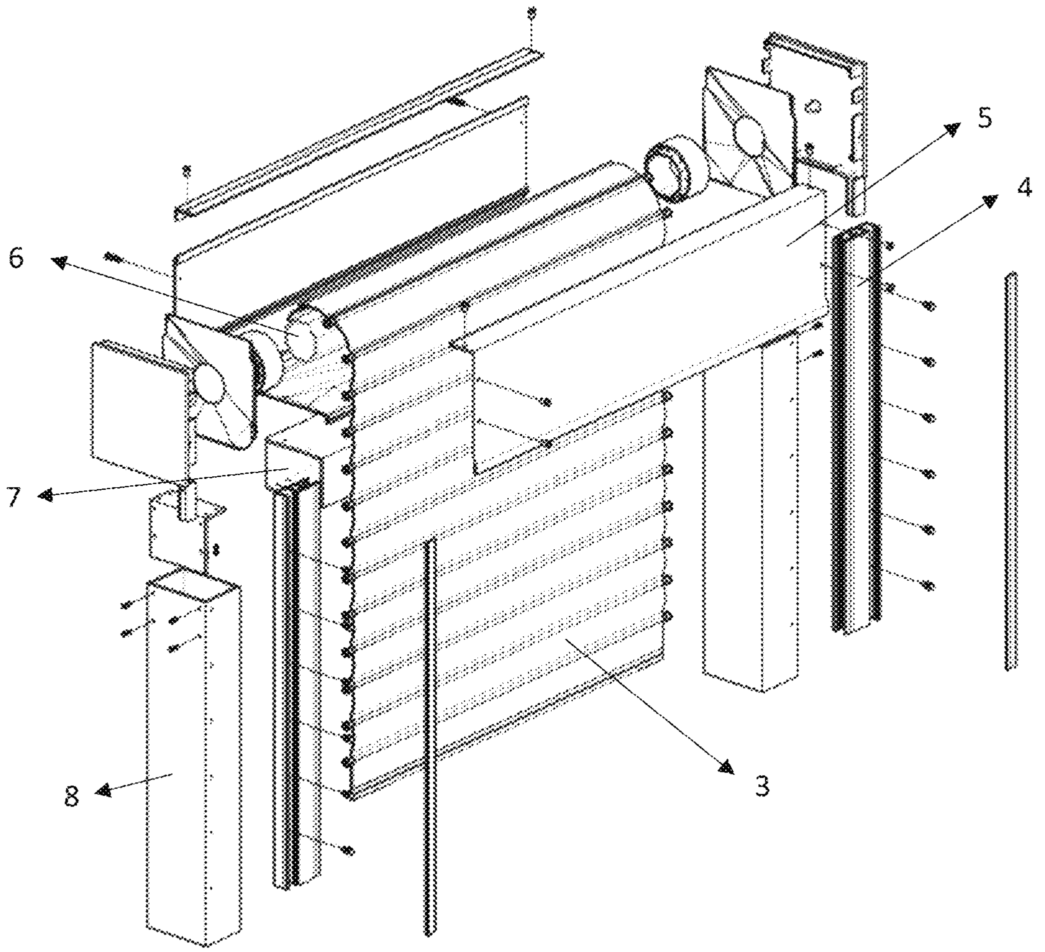
FIG. 3 shows an exploded view of FIG. 2.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Certain terminology is used in the following description for convenience only and is not limiting. The words "lower," "upper," "bottom," "top," "front," "back," "left," "right" and "sides" designate directions in the drawings or the system to which reference is made, but are not limiting with respect to the orientation in which the modules or any assembly of them may be used.

Figure 4:
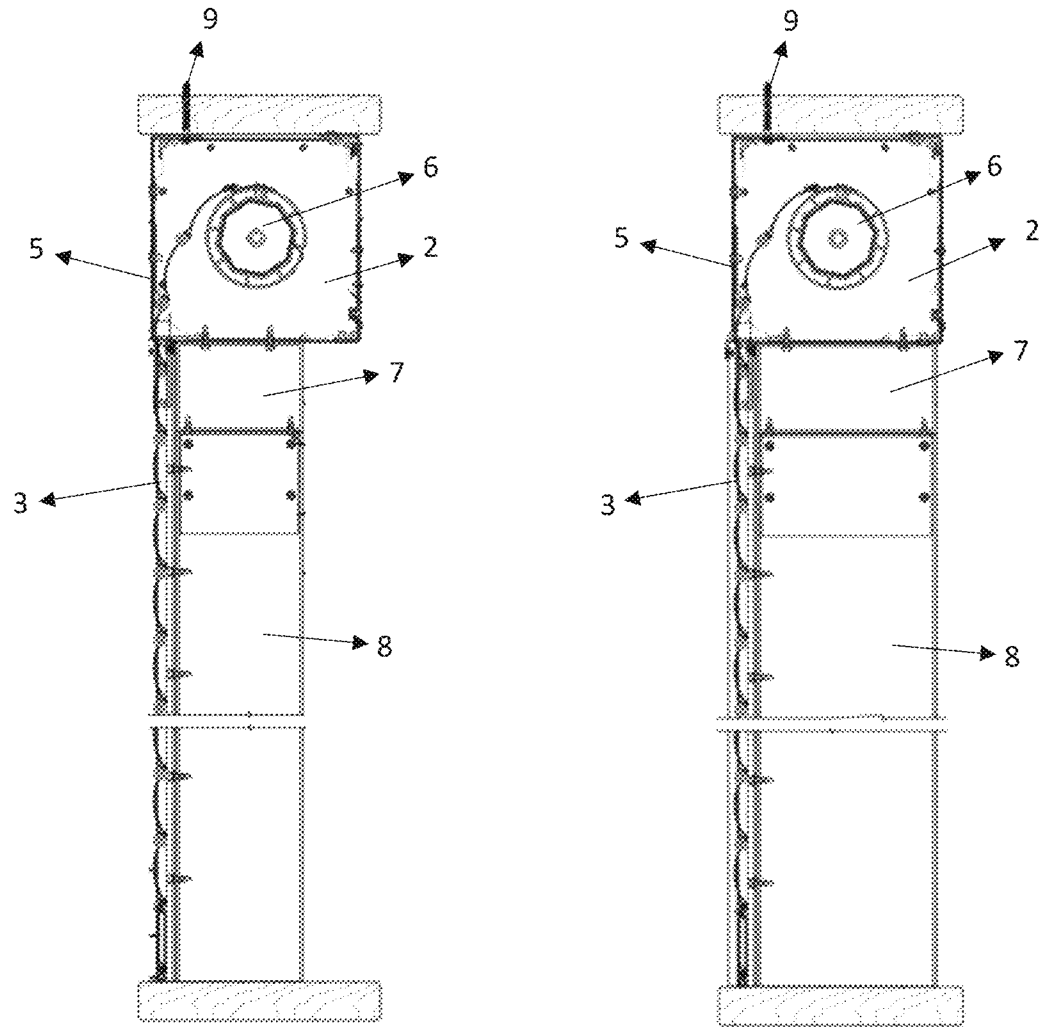
FIG. 4 is an exemplary view of the internal structure of the preferred embodiment in accordance with the principles of the present disclosure.
Figure 5:
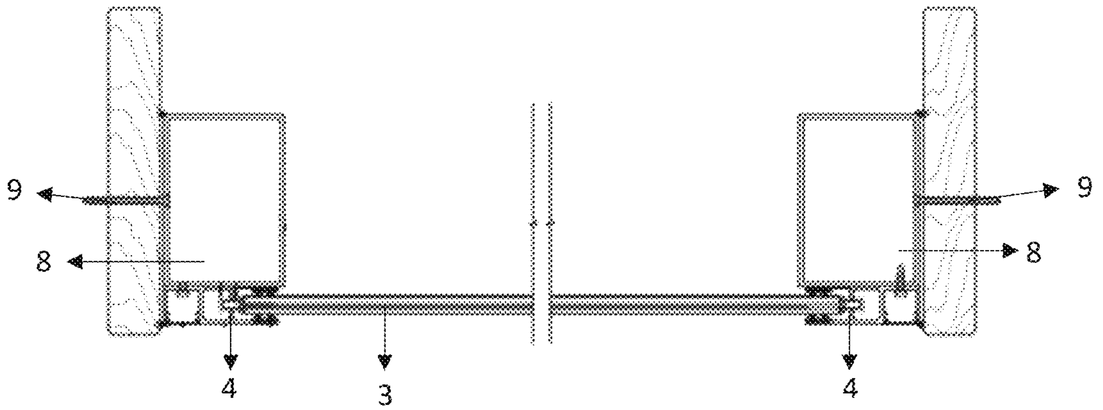
FIG. 5 is an exemplary overhead view of the structure of the preferred embodiment in accordance with the principles of the present disclosure.
Figure 5:
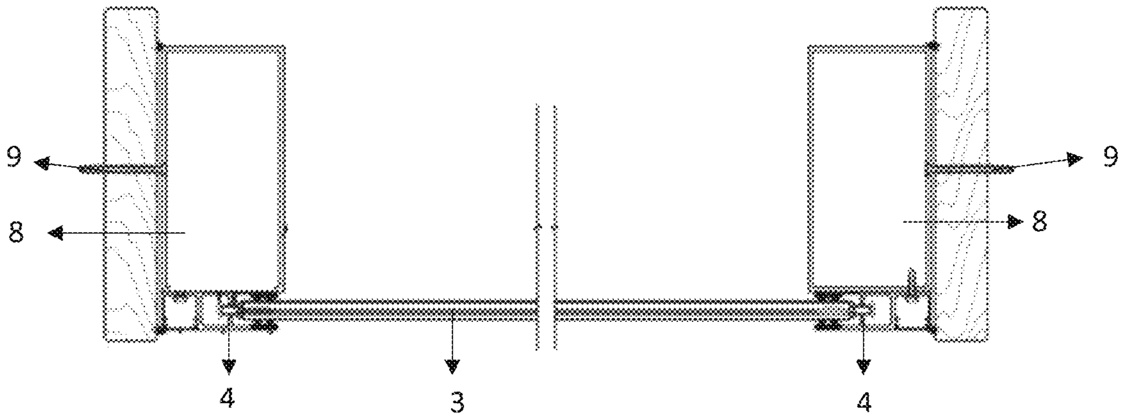

The first preferred embodiment of the present disclosure relates to a shutter structure for a window or door. The windows and doors are made of a laminated glass, which is made of annealed glass and a polyvinyl butyral ("PVB") interlayer. Annealed glass refers to a glass cooling process that improves the durability of the glass and reduces the internal stresses in the glass that may result in breakage. Whereas the PVB interlayer is a resin used for producing laminated glass, so that if the laminated glass is broken, it holds the fragments together, evading disintegration of the glass that may result in injury to persons. This first preferred embodiment, as shown in FIG. 1, FIG. 2, FIG. 3 and FIG. 7, comprises a shutter frame 1 with an aluminum box 2, a shutter 3 and shutter tracks 4 for allowing the shutter 3 to roll up or down. FIG. 4 shows the internal structure of the shutter system and the aluminum box 2 comprising a hood 5 for protecting the shutter 3 when it is rolled, and a rod 6 for rolling and storing the shutter 3 when rolled. A horizontal aluminum tube frame 7 connects with a vertical aluminum tube frame 8 at the sides of the shutter. FIG. 5 depicts an internal overhead view of the shutter system showing the internal details of the shutter system, the placement of the shutter 3, shutter tracks, 4 and the vertical aluminum tube frame 8. The shutter 3 rolls up and down through a roll-up mechanism 10 comprised of gears, a motor and supporting end plates. The roll-up mechanism 10 may be electric, allowing the shutter 3 to roll up or down by using a switch. The switch can be manipulated in order to activate the roll-up mechanism 10 for rolling the shutter 3 up or down. As the roll-up mechanism 10 rolls the shutter 3 upward, the rod 6 turns and rolls the shutter 3 into the rod 6 for storing inside the aluminum box 2. As the roll-up mechanism 10 rolls the shutter 3 downward, the shutter 3 unrolls from the rod 6 in order to cover the window or door.

The window may be fixed or operable, wherein the operable window provides for multiple window configurations: project-out window, casement window or double hung window. Operable windows are windows that open and close. For example, the project-out window is comprised of hinges at the top the operable window panel, which allow the window to open outward, by using: a handle to swing the bottom section of the window outward. On the other hand, the casement window is comprised of hinges on either the left or right side of the operable window panel that allow the window to open outward, by using a handle to swing open the unhinged side of the window, either to the left or to the right. The double hung window comprises an upper sash and a lower sash, which are two operable window panels that move, independently form one another, upward or downward when opening and closing the window. The windows may also be mulled, meaning that the fixed or operable window may further comprise a union mullion, which is a part of the window frame that connects different types of windows. The union mullion connects a fixed or operable window with another fixed or operable window that is over or under it. The union mullions also provide for side-by-side configurations of different windows, where the union mullions connect the fixed or operable windows that are adjacent to each other.

The door embodiment of the present shutter system comprises an entrance door or sliding doors. The entrance door may include two entrance door leaves that swing open outwardly towards opposite sides of each other (double entrance door) or a single entrance door leaf that opens outward towards either the left or right side (single entrance door). The sliding door comprises sliding door leaves that slide open sideways and are drawn across tracks located within the top and bottom of the door frames, as opposed to the entrance door panel that swing open on hinges located at the left or right side of the entrance door. The sliding doors include a meeting stiles configuration, when the doors are closed, wherein the stiles in the sliding door panels meet within the same track. The stile is an upright part of the sliding door panel frame. In other words, the vertical sides of the sliding door panel frames meet within the track. Moreover, the sliding doors may also include an interlock configuration wherein the sliding door panels meet in the closed position with one stile of a sliding door panel engaging with the opposite side of the adjacent sliding door panel located within the adjacent track.

Figure 6:
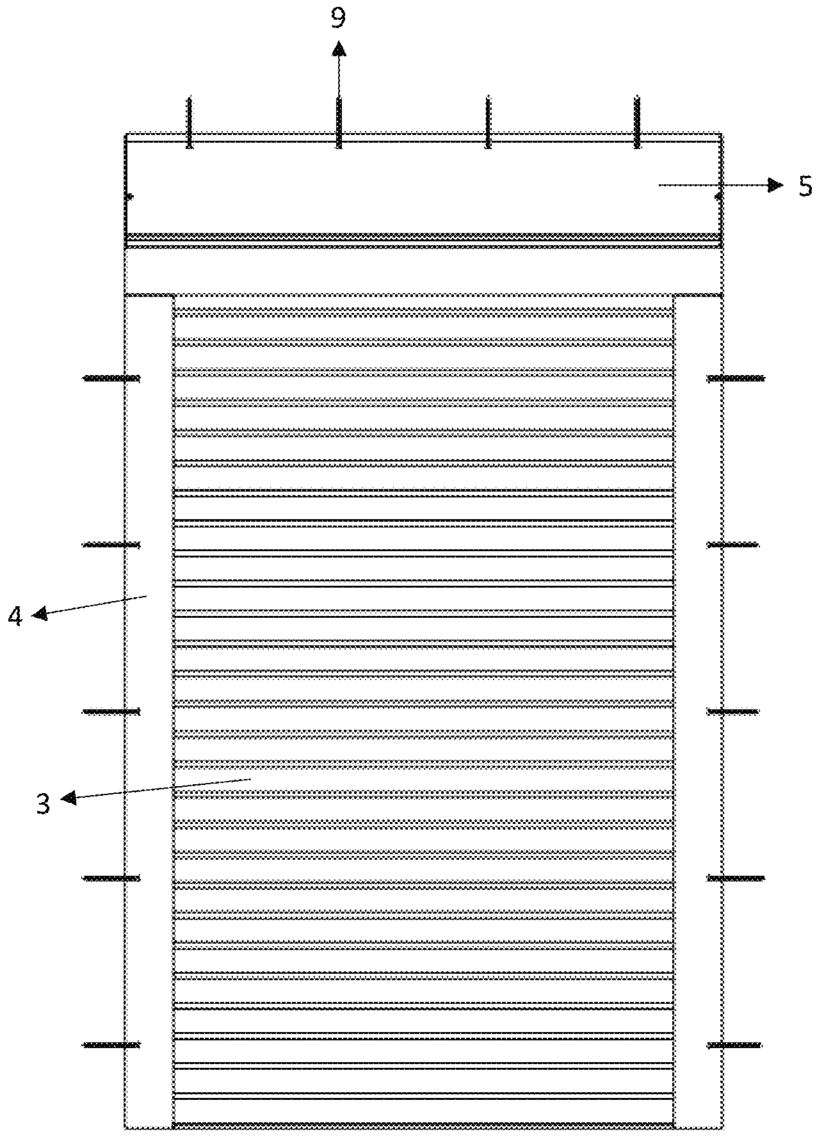
FIG. 6 is an exemplary view of the anchor layout of the preferred embodiment in accordance with the principles of the present disclosure.
Figure 7:
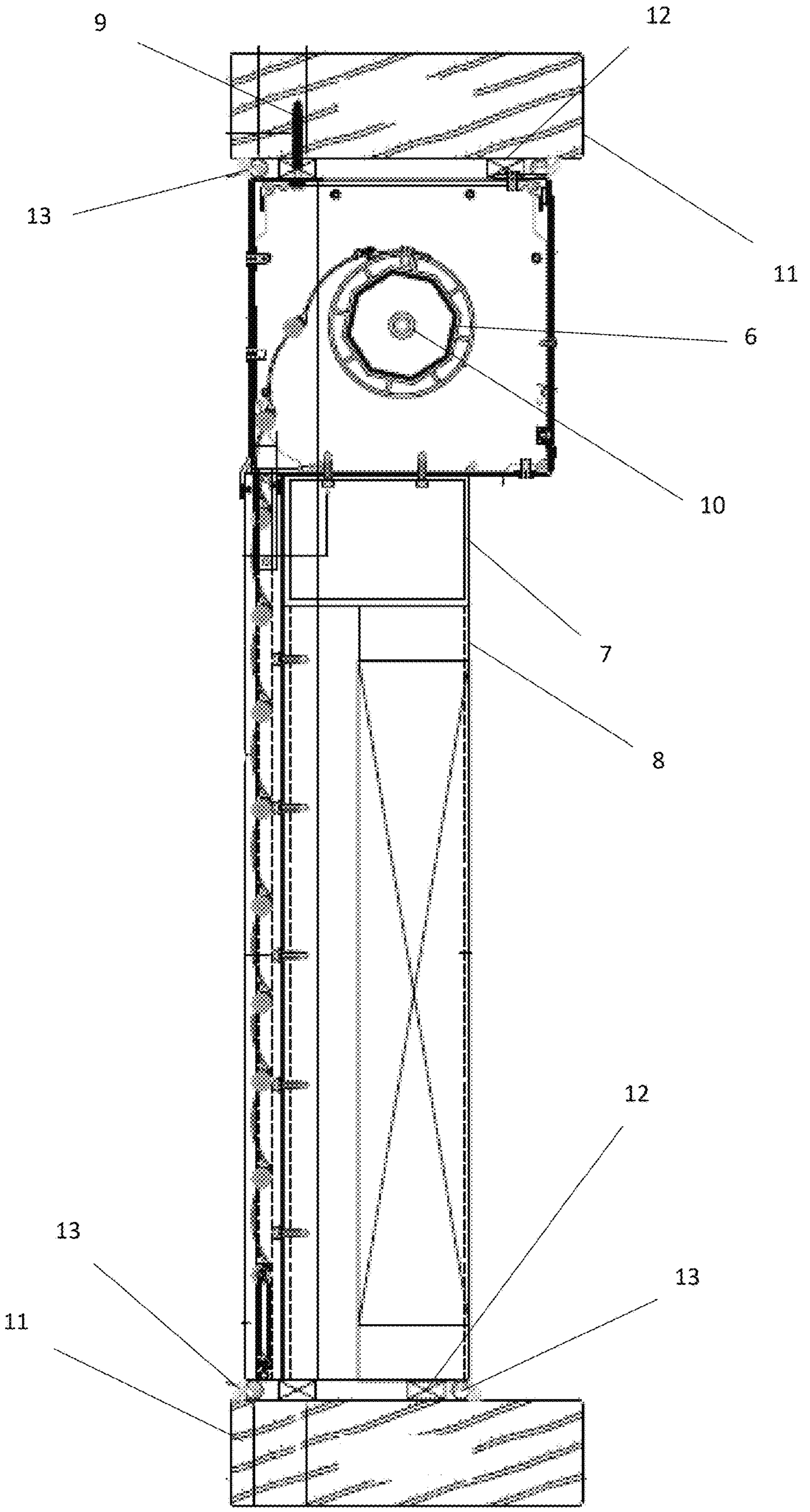
FIG. 7. shows a side view of the internal components of the preferred embodiment in accordance with the principles of the present disclosure.
Figure 8:
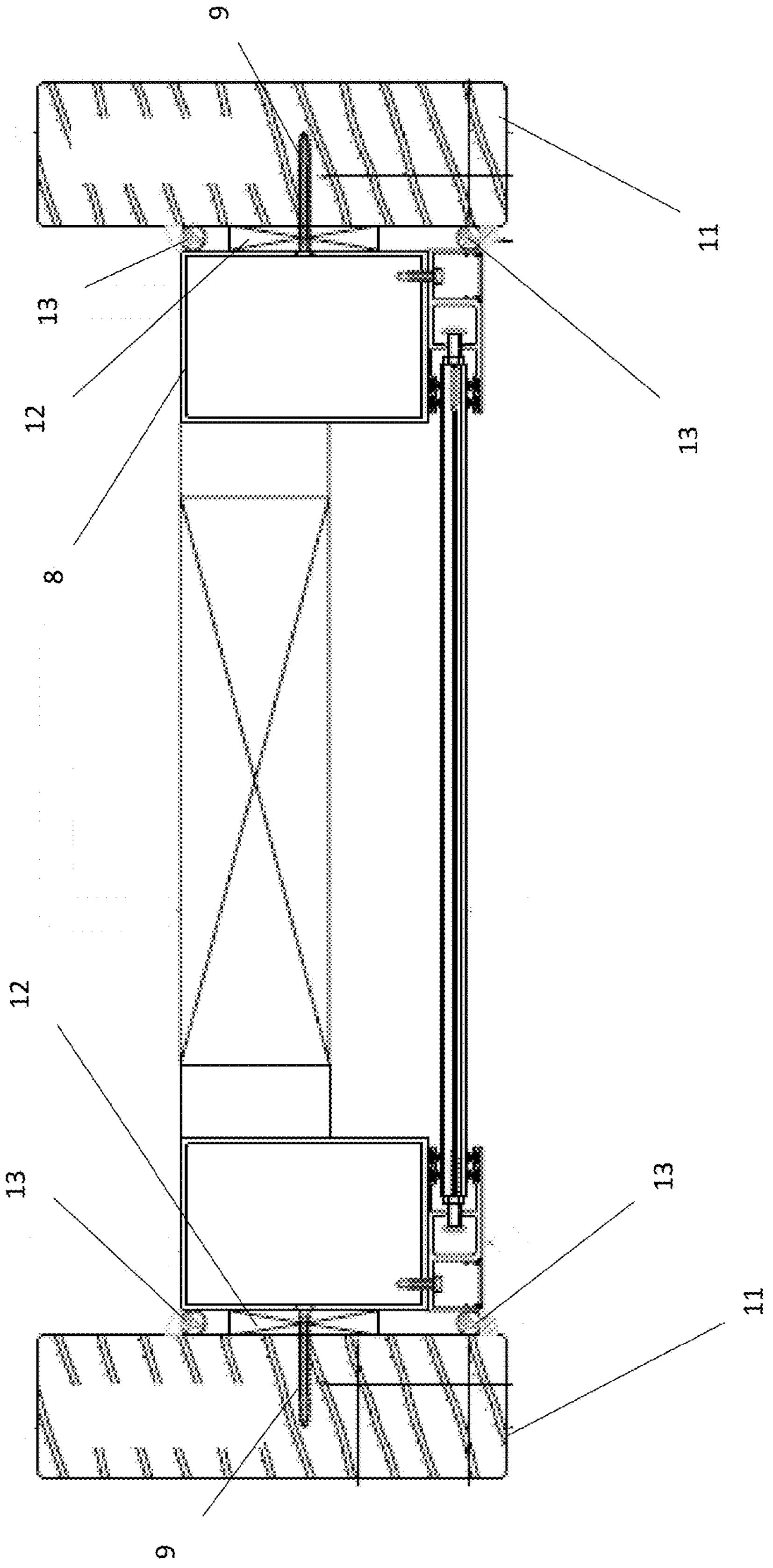
FIG. 8 shows a top view of the internal components of the preferred embodiment in accordance with the principles of the present disclosure.

The system is installed into the opening of a building by anchoring the system to a substrate in critical locations of the door or window frames, as shown in FIG. 6. Anchoring is the process of attaching parts or pieces to a substrate. The system uses multiple screws 9 as anchors to attach the parts to the substrate. The substrate is the surface to which the parts of the system are adhered to. For example, the substrate can be wood, metal or concrete. As shown in FIGS. 7 and 8, the top part of the system is anchored to the substrate by using a wood buck 11, which is a wood frame that is set into the substrate to define the space for window installation. A shim 12 is fixed between the wood buck 11 and the top part of the system to fill the gap between the wood buck 11 and the top of the system and to force the wood buck 11 into place. A backer rod 13 is a cylindrical type of foam that is used to fill gaps between building materials and is installed towards the front of the system, between the wood buck 11 and the top of the system. The system is anchored at the top by using a wood screw that passes through the frame of the system, the shim 12 and the wood buck 11, anchoring the top part of the system into the substrate. Internally, the shutter tracks are adhered to the aluminum tube frames by using a self-tapping or self-drilling screw, which is a type of screw that can tap its own hole as it is twisted into the material and is typically used in metal surfaces. The sides of the system are anchored by installing a shim 12 and backer rod 13 between the substrate and the window frame or door frame. The window frame, or door frame, and the shim 12 are anchored to the substrate using a screw for concrete, or concrete screw, such as an ITW: Tapcon screw or an Elco Ultracon+screw. Similarly, the bottom of the system is anchored by securing the bottom part of the frame and a shim 12 into the substrate with an ITW Tapcon screw or an Elco Ultracon+screw. The ITW Tapcon screws are used in the window embodiments of the system and the Elco Ultracon+screws are used for the door embodiments.

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions. It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement. And combination of parts may be resorted without departing from the spirit and scope of the invention as claimed. Accordingly, the scope of the present invention is defined by the appended claims rather than the forgoing description of embodiments.

What is claimed is:

1. A storm shutter system for integration into a window or door frame, comprising:

a shutter frame comprising:

a vertical aluminum tube frame having a top end, a bottom end, and a frame surface extending between the top and bottom ends;

a horizontal aluminum tube frame having a first end, a second end, and a frame surface extending between the first and second ends;

wherein the horizontal aluminum tube frame is connected to the top end of the vertical aluminum tube frame;

an aluminum box comprising:

a hood defining an interior space and including a front end, a rear end opposite the front end, a first sidewall, a second sidewall opposite the first sidewall, a bottom end, and a top end opposite the bottom end;

wherein the first sidewall and second sidewall of the hood connect the front end and rear end of the hood to each other, and wherein each of the front end, rear end, first sidewall, and second sidewall are vertically connected to the bottom end and top end of the hood to enclose the interior space;

a rod positioned within the interior space of the hood, the rod configured to roll and store a storm shutter;

a storm shutter positioned within the aluminum box and configured to roll up onto the rod and unroll downward between an open position and a closed position;

one or more shutter tracks, each comprising a first end, a second end, and a shutter track surface extending between the first and second ends;

wherein a first end of the one or more shutter tracks is connected to the bottom end of the hood, and the shutter track surface is connected to the frame surface of the vertical aluminum tube frame, the one or more shutter tracks configured to guide movement of the storm shutter;

wherein the rod is operably connected to a roll-up mechanism positioned within the aluminum box, the roll-up mechanism being configured to rotate the rod and thereby drive movement of the storm shutter between an open position and a closed position;

an anchoring mechanism configured to secure the aluminum box to a substrate, the anchoring mechanism comprising:

a wood buck attached to the substrate;

a first shim fixed between the wood buck and the aluminum box;

a first backer rod positioned between the wood buck and the top end of the hood for gap sealing; and one or more screws extending through the aluminum box, the first shim, and the wood buck, anchoring the aluminum box into the substrate;

one or more screws securing the shutter tracks to the vertical aluminum tube frame;

a window or door frame anchored to the substrate, the window or door frame comprising:

a second shim and second backer rod positioned between the window or door frame and the substrate; and one or more screws extending through the window or door frame and the second shim, securing the window or door frame and second shim to the substrate.

2. The storm shutter system of claim 1, wherein said storm shutter is made of comprises an aluminum extrusion material.

3. The storm shutter system of claim 1, wherein said storm shutter system for a window or door can is adapted to be fixed or repaired while installed on the window or door frame.

4. The storm shutter system of claim 1, wherein said storm shutter system integrated into a window er door is resistant to storms.

5. The storm shutter system of claim 1, wherein said storm shutter system integrated into a window or door is resistant to projectiles.

* * * * *